United States Patent [19]

Caruso et al.

[11] Patent Number: 4,771,238

[45] Date of Patent: Sep. 13, 1988

[54] DEVICE FOR MEASURING, WITHOUT CONTACT, THE THICKNESS OF METALLIC MATERIALS AT TEMPERATURES ABOVE THE CURIE TEMPERATURE

[75] Inventors: Eugenio Caruso; Antonio Gray, both of Milan, Italy

[73] Assignees: Cise-Centro Informazioni Studi Esperienze S.p.A., Milan; Innse-Innocenti Santeustacchio S.p.A., Brescia, both of Italy

[21] Appl. No.: 619,345

[22] Filed: Jun. 11, 1984

[30] Foreign Application Priority Data

Jun. 15, 1983 [IT] Italy ............................ 21637 A/83

[51] Int. Cl.$^4$ .................. G01B 7/10; G01R 33/12; G01R 33/14; G01N 27/72
[52] U.S. Cl. .................................. 324/229; 324/233; 324/225
[58] Field of Search ............... 324/229, 230, 233, 203, 324/224, 225

[56] References Cited

U.S. PATENT DOCUMENTS

| | | | |
|---|---|---|---|
| 3,609,530 | 9/1971 | Joinson | 324/225 |
| 3,764,897 | 10/1973 | Greenwood | 324/229 |
| 3,848,182 | 11/1974 | Gerner | 324/233 |
| 4,461,995 | 7/1984 | Harris | 324/224 |
| 4,534,405 | 8/1985 | Hulek et al. | 324/203 |
| 4,578,999 | 4/1986 | Abend et al. | 73/643 |

Primary Examiner—Reinhard J. Eisenzopf
Assistant Examiner—Walter E. Snow
Attorney, Agent, or Firm—Diller, Ramik & Wight

[57] ABSTRACT

The sensor is constituted by a magnetic core with pole pieces and by an electric coil wound on the body of said core. With said coil there are associated a sinusoidal current generator and impedance measurement means. A processor determines the thickness from the measured value of said impedance.

13 Claims, 3 Drawing Sheets

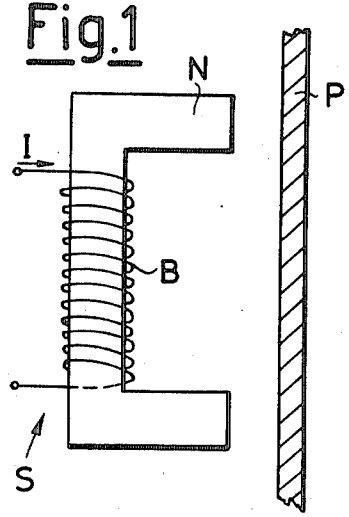
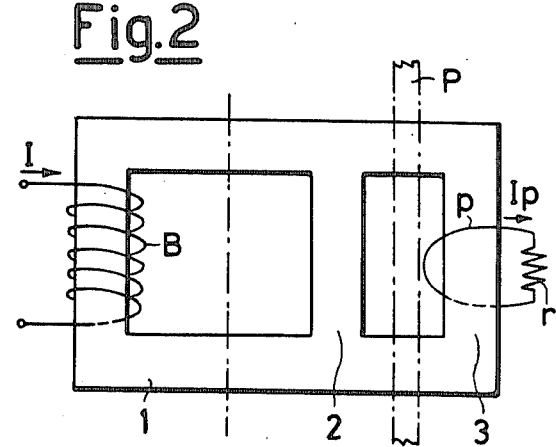
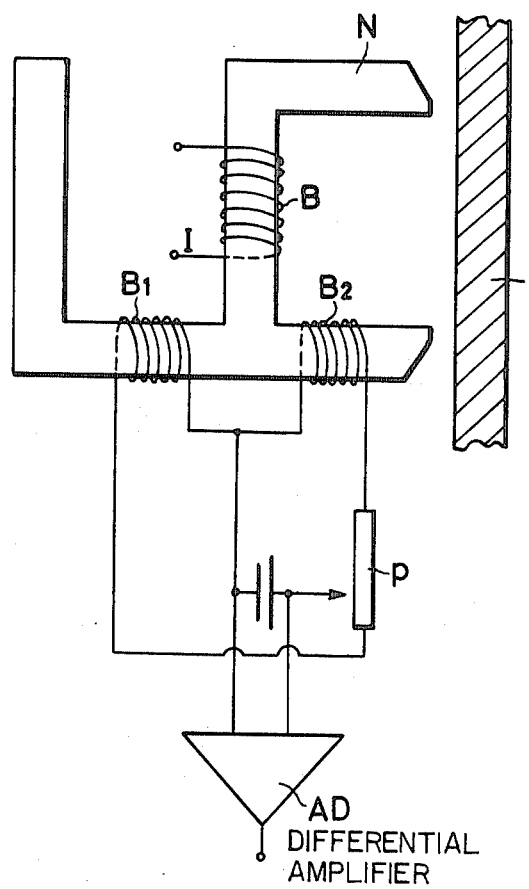

DEVICE FOR MEASURING, WITHOUT CONTACT, THE THICKNESS OF METALLIC MATERIALS AT TEMPERATURES ABOVE THE CURIE TEMPERATURE

This invention relates to a measuring device for the "contactless" measurement of large thicknesses for use on conductive walls at a temperature exceeding the Curie temperature. A typical application of the measuring device is to measure the thickness (up to about 10 cm) of plates and tubes leaving hot rolling mills.

Measurements of this kind are currently made by the following methods:

(a) γ-ray or X-ray radiography.

(b) Echography using ultrasonic electromagnetic transducers.

These systems have various drawbacks, which can be summarised as follows:

(a) Dimensions, cost, psychological problems and the need for adequate radiation shielding in the case of γ-ray systems. Dimensions, cost, low accuracy and the need for adequate shielding in the case of X-ray systems.

(b) The complexity of ultrasonic electromagnetic transducer systems, the fact that the measuring sensitivity is highly dependent on the sensor-wall distance, and the need to keep the sensor very close to the wall (in practice not more than 1 mm distant).

The object of the present invention is to provide a measuring device for the "contactless" thickness measurement of conductive walls above the Curie temperature.

According to the invention this object is attained by a measuring device characterized by comprising a sensor constituted by a core with pole pieces which can be made to approach the wall to be examined and by an electric coil wound on the body of said core, means for supplying an alternative current to said coil, means for measuring the impedance of said coil, and computer means for obtaining the thickness of the wall under measurement from the measured value of said impedance.

Large thicknesses can be measured if the metal alloy of the wall to be measured is above the Curie temperature. This physical condition means that the material is no longer ferromagnetic (nor contains ferromagnetic phases or precipitates), but instead is in a dia or paramagnetic state. The absence of ferromagnetism enables the lines of force of the magnetic field to penetrate into the material. The high temperature means that the metal alloy has a sufficiently high electrical resistivity to limit the dissipation of the magnetic field energy by the eddy current effect, and thus ensure good penetration of the alternating magnetic field.

The characteristics of the present invention will be apparent by reference, by way of example, to the accompanying drawings in which:

FIG. 1 shows the basic scheme of a sensor according to the invention;

FIG. 2 shows the equivalent magnetic circuit of said sensor, in combination with the wall subjected to thickness measurement;

FIG. 7 shows a different method for mounting the coils in a sensor for a measuring device according to the invention.

FIG. 1 shows a sensor S constituted by a ferromagnetic coil N (of C shape), the pole pieces of which face the conductive wall P to be measured and are disposed a short distance therefrom. On the central portion of the ferromagnetic core N there is wound a coil B, which is fed with sinusoidal current I and has a measurable impedance Z.

Figure 3:
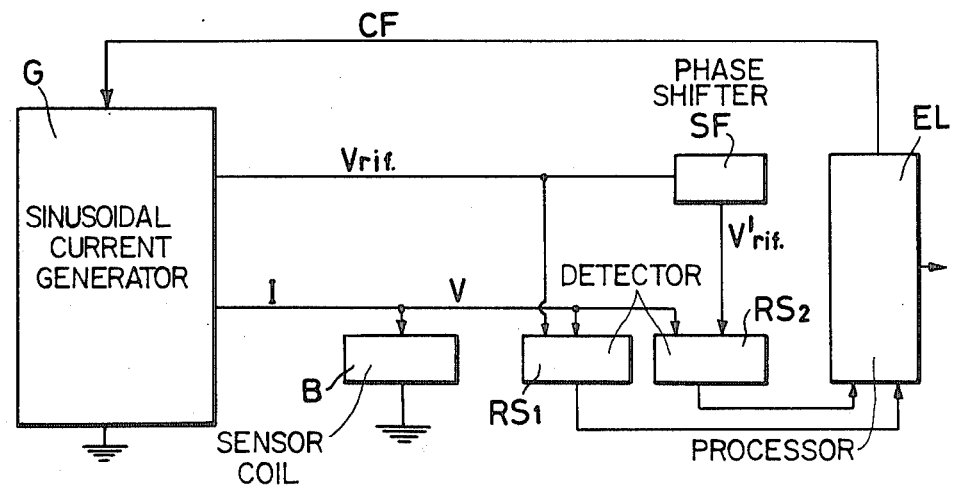
FIGS. 3, 4 and 5 are diagrams of three possible examples of circuit arrangements suitable for feeding the coil, measuring its impedance and processing the measurement.

This described assembly corresponds to the equivalent magnetic circuit of FIG. 2, which comprises a branch 1 equivalent to the ferromagnetic core N, a branch 2 equivalent to the passage through air of the magnetic flux between the core N and wall P, and a branch 3 equivalent to the passage in air downstream of the wall P; in the equivalent circuit model, the wall P is assumed thin relative to the air thicknesses and is thus negligible. On the other hand, the material of P is at a temperature higher than the Curie temperature, and the magnetic permeability of the air and of the material are approximately equal ($\mu_r \approx 1$), so that the presence of the wall does not alter the distribution of the magnetic field lines of flux. The three said branches are characterised by different values of magnetic reluctance, ie:

in the branch 1 there is a reluctance $R_1$, which is negligible compared with the other two because of the high premeability of the ferromagnetic material which constitutes the core N;

in the branch 2 there is a reluctance $R_2$, which is determined by the air upstream of the wall P;

in the branch 3 there is a reluctance $R_3$, which is determined by the air downstream of the wall P and equivalent to the wall P. The turns of the coil B, which are n in number, are linked with the branch 1, whereas one turn p is to be considered linked with the third branch, to represent the conductive wall P, which has a resistance r proportional to the resistivity of its constituent material. In a situation of this kind, feeding the coil B with a sinusoidal current I of angular frequency ω gives rise to a magnetomotive force $$f.m.m. = n I$$

to which there corresponds in the branch 1 a magnetic flux $$\phi_1 = \phi_2 + \phi_3$$

where $\phi_2$ and $\phi_3$ represent the contributions provided by the fluxes present in the branches 2 and 3 respectively. Whereas $\phi_2$ can be calculated by considering only the reluctance $R_2$, i.e.

$$\phi_2 = n I / R_2$$

the flux $\phi_3$ also depends on the current Ip induced in the conductive wall P (and thus in the turn p with resistance r), i.e.

$$\phi_3 = (n I - I_p)/R_3$$

The current $I_p$ itself depends on the derivative of $\phi_3$ with respect to time, and on the resistance r offered by the wall P. Using vectorial notation:

$$I_p = j\omega\phi_3 r$$

from which, using the previous equation:

$$\phi_3 = \frac{nI/R_3}{1 + j\omega/rR_3}$$

The voltage V applied across the coil B can be calculated thus:

$$V = j\omega\phi_1 n = j\omega n \left( nI/R_2 + \frac{nI/R_3}{1 + j\omega/rR_3} \right)$$

It follows that the impedance Z of the coil B is given by the equation:

$$Z = \frac{V}{I} = j\omega L \left( 1 - \frac{\alpha\omega^2\tau^2}{1 + \omega^2\tau^2} \right) + \frac{\alpha\omega^2\tau}{1 + \omega^2\tau^2} \cdot L \quad (1)$$

in which the following parameters have been introduced:

$$\alpha = \frac{R_2}{R_2 + R_3}; \quad L = n^2\left( \frac{1}{R_2} + \frac{1}{R_3} \right); \quad T = \frac{1}{rR_3}$$

where α depends on the ratio of the reluctance of the magnetic paths upstream of the wall P to the reluctance external to the core and thus depends on the distance between the sensor and the wall, L is equal to the inductance of the coil B in the absence of the conductive wall, and T is a constant proportional to the inverse of the resistance presented by said wall, and thus proportional to the wall thickness.

The above relationship (1) makes it possible to obtain the required thickness of the wall P from the measurement of the impedance Z of the coil B, by introducing the sensor-wall distance parameter as described hereinafter.

For this purpose it is possible to operate in one of the following ways:

(A) By obtaining an independent measure of the sensor-wall distance, for example by means of capacitive, optical, microwave or other sensors, the thickness of the wall P can be determined by measuring one of the following constituent parameters of the impedance Z of the coil B:

(a) the modulus of the coil impedance $$Z = \frac{\omega L}{1 + \omega^2\tau^2} \sqrt{1 + \omega^2\tau^2[1 + \omega^2\tau^2(\alpha - 1)^2 + 1]} \quad (2)$$

(b) the real part of the coil impedance $$Z_r = \frac{\alpha\omega^2\tau}{1 + \omega^2\tau^2} \cdot L \quad (3)$$

(c) the coefficient of the imaginary part of the coil impedance $$Z_i = \left( 1 - \frac{\alpha\omega^2\tau^2}{1 + \omega^2\tau^2} \right)\omega L \quad (4)$$

The parameter $K = \omega\tau$ is an index of the magnetic field penetration through the wall P. The smaller the value of K the greater the transparency. In this respect, for penetration to be good, the impedance of the third branch $\omega/R_3$ must be less than the resistance r of the equivalent turn:

$$\frac{\omega}{R_3} < r \text{ and thus}$$

$$K = \omega\tau < 1$$

The relationship is satisfied the smaller the value of $\tau$. As $\tau = 1/rR_3$, it is necessary for r to be large, this condition being satisfied when the material is at high temperature, as will be the case in thickness measurement at the exit of hot rolling mills. By introducing a first order approximation, the real part of the impedance becomes (where $K \ll 1$)

$$Z_r = \alpha\omega^2\tau L$$

with a very strong dependence (1/r) on the presence of the wall P. From each of the expressions 2, 3, 4, 5, the values of L and ω being known and having found the values of $R_2$ and $R_3$, it is possible, from a knowledge of the sensor-wall distance and using theoretical calculations and tables of theoretical or experimental origin, to obtain the value of r and thus obtain the thickness of the wall P, as the average resistivity of this latter is known. This latter passage can also be effected either on the basis of theoretical calculations or, more conveniently, from experimental results.

(B) Simultaneous measurements are made of the impedance of the coil B, these measurements providing its real part and imaginary part, as indicated heretofore. These measurements can be processed in the following ways:

(a) by comparing them with experimental tables which provide the corresponding values of thickness and sensor-wall distance;

(b) by calculating the expression:

$$\frac{(\omega L - Z_i)^2}{Z_r^2 + (\omega L - Z_i)^2} = \frac{\omega^2\tau^2}{1 + \omega^2\tau^2}$$

which is dependent on 1/r and independent of the ratio $R_2/(R_2 + R_3)$ and hence of the sensor-wall distance.

(C) The voltage signal jωLI, present across the coil B when the conductive wall P is absent, is substracted from the voltage measured when the wall is present, and the phase difference θ between the resultant signal and the current fed to the coil is measured.

This phase difference is given by $$\theta = \arcsin \frac{(\omega L - Z_i)}{\sqrt{(\omega L - Z_i)^2 + Z_r^2}}$$

from which $$\sqrt{\frac{\omega^2\tau^2}{1 + \omega^2\tau^2}} = \sin\theta$$

from which it is possible to deduce the required value of the thickness of the wall P once the sensor-wall distance is known.

(D) Several coil impedance measurements are made at different frequencies. In this respect, the magnetic fields at lower frequencies are more sensitive to the thickness, whereas those at higher frequencies are more sensitive to the sensor-wall distance as a consequence of the skin effect, which limits magnetic flux penetration into the conductors at high frequency. The thickness measurement and sensor-wall distance can be obtained by suitable mathematical manipulation or by using tables.

Figure 4:
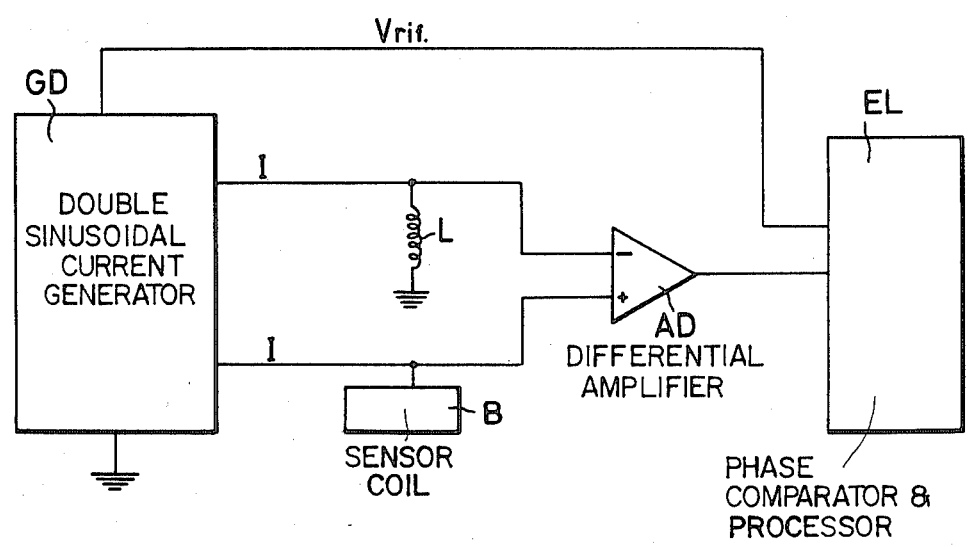
Figure 5:
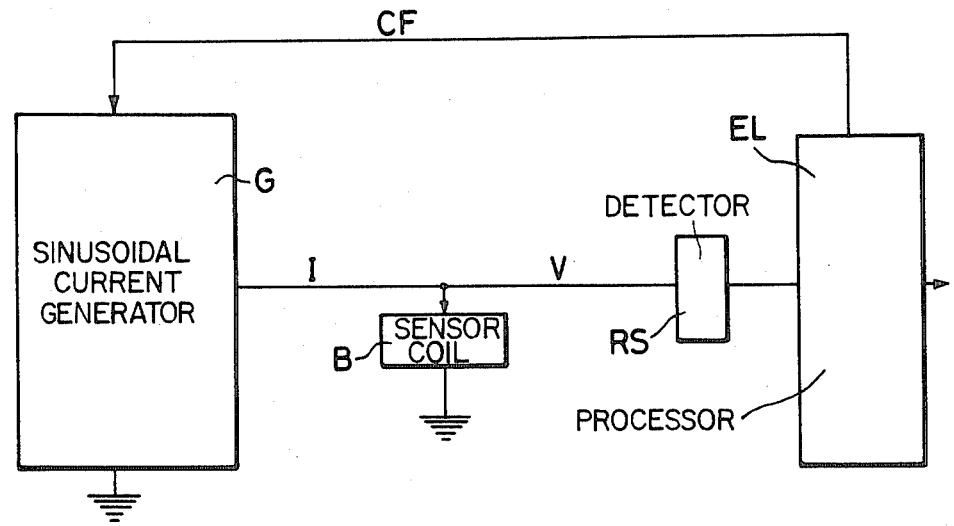

To employ the methods explained in the preceding paragraphs A, B and D, the circuit arrangement illustrated in FIG. 3 can be used, which is shown and described here by way of non-limiting example. In said figure, it can be seen that a generator G generating sinusoidal current of angular frequency $\omega$ feeds the current I to the sensor coil B, and a reference voltage $V_{rif}$, which a phase shifter SF shifts through 90° so that it becomes $V'_{rif}$. The voltage V across the coil B, which indicates the impedance of this latter, is recitified by two synchronous detectors $RS_1$ and $RS_2$ which are piloted by the reference voltage $V_{rif}$ and $V'_{rif}$ respectively, and the relative outputs are fed to a computer EL such as a model AMS 8086 computer of Siemens which, in accordance with the proposed methods, is able to determine the value of the thickness of the wall P. If measurements at different frequencies are required, the computer EL can control the frequency of the sinusoidal generator G by means of a frequency control signal CF. In the case of the method described in the preceding paragraph C it is advisable to use the circuit arrangement of FIG. 4, in which a double sinusoidal generator GD feeds two indentical currents I to the sensor coil B and to an inductor L having a coefficient equal to that of the coil when the wall is absent. The difference between the two resultant voltage signals, which is obtained by means of a differential amplifier AD, is then compared, with regard to the phase, with a reference signal $V_{rif}$ provided by the generator GD. This phase comparison is made by a phase comparator and computer EL, by means of which the thickness of the wall P can be obtained. When employing method A, and wishing to use only the modulus value of the impedance Z it is possible to use the more simple circuit arrangement shown in FIG. 5. A generator G generating sinusoidal current with angular frequency $\omega$ feeds current I to the sensor coil B. The voltage V across the coil B, which is indicative of the impedance of this latter, is rectified by RS and fed to a computer EL able to determine the thickness of the wall P.

Instead of being constituted by a single coil which operates both as an exciter element and as an inductance, the impedance variations of which are measured, the sensor can be constructed differently in order to improve the signal/noise ratio and stability, and to simplify the electrical circuits.

Figure 6:
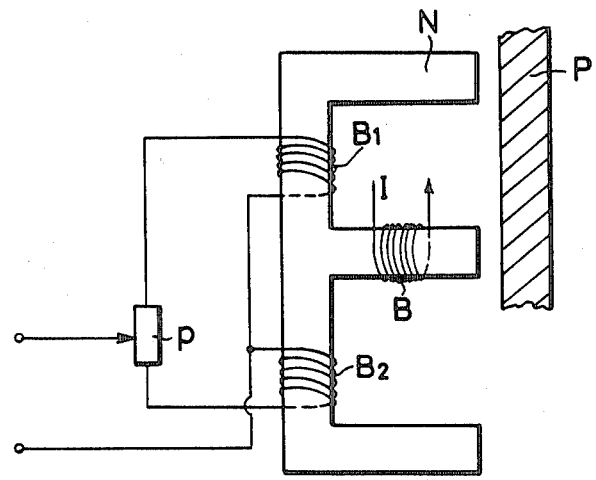
FIG. 6 shows the basic scheme of a different type of sensor for a measuring device according to the invention.

FIG. 6 shows the basic scheme of said sensor. An exciter coil B and two measurement coils $B_1$ and $B_2$ connected into a Wheatstone bridge are wound on a core. A potentiometer p enables the bridge to be zeroed when the input to be measured is absent. FIG. 7 shows a different coil assembly scheme which has been tested experimentally. The core is of generally h-shaped configuration, the exciter coil B being mounted on the vertical central branch and the two bridge coils $B_1$ and $B_2$ being mounted on the adjacent horizontal branches of the core.

In all cases, whatever the type of sensor used, the sensor should be cooled and protected from flames and fumes which may accompany the material to be measured. Although the description has referred heretofore to the measurement of a flat wall, it is possible to use analogous methods to measure the thickness of a tube, whether the tube is at rest or moving. With two opposing sensors fed by the same sinusoidal generator, and employing means for measuring the variations in the impedance differences between the two coils of the opposing sensors, it is also possible to measure the eccentricity of said tube. By means of the thickness measurement of more than two sensors it is possible to deduce tube eccentricity.

We claim:

1. A measuring device for the "contactless" measurement of the thickness of materials above the Curie temperature comprising a sensor constituted by a magnetic core with pole pieces positioned a distance spaced from but adjacent a surface of the wall to be examined and by an electric coil wound on a body of said core, means for supplying a sinusoidal current to said coil, means for measuring the impedance of said coil when the material of the wall is above the Curie temperature thereof, means for obtaining a measurement of the sensor pole pieces-to-wall surface distance, and computer means for obtaining the thickness of the wall under measurement as a derivative of the measured value of said impedance and said sensor pole pieces-to-wall surface distance.

2. A measuring device as claimed in claim 1, characterised in that said core is ferromagnetic material.

3. A measuring device as claimed in claim 1, characterised in that said means for supplying a sinusoidal current comprise a sinusoidal generator for providing the sinusoidal feed current for the coil and to provide a reference voltage, and said impedance measurement means comprise two synchronous detectors for rectifying the voltage developed across the coil in accordance respectively with said reference voltage and with a voltage the phase of which is shifted through 90° relative to said reference voltage, and means for feeding the outputs of said detectors to said computer means.

4. A measuring device as claimed in claim 3 characterised in that the frequency of the sinusoidal current generator is varied as an inverse function of the thickness of the material to be examined.

5. A measuring device as claimed in claim 1, characterised in that said means for supplying a sinusoidal current comprise a double sinusoidal generator for providng sinusoidal feed current for the coil and for providing an identical feed current for an inductor having an inductance equal to that of the coil when the wall is absent, said impedance measurement means comprise a differential amplifier for obtaining the difference between the two voltages from the sensor coil and the inductor, and a phase comparator for making a phase comparison between said difference and a reference voltage provided by said generator.

6. The measuring device as claimed in claim 5 characterised in that the frequency of the sinusoidal current generator is varied as a function of the thickness of the material to be examined.

7. A measuring device as claimed in claim 1, characterised in that said means for suppying a sinusoidal current comprise a sinusoidal generator for providing the sinusoidal feed current for the coil, and said impedance measurement means comprise a detector for rectifying the voltage developed across the coil; the output of said detector being fed to said computer means.

8. The measuring device as claimed in claim 7 characterised in that the frequency of the sinusoidal current generator is varied as a function of the thickness of the material to be examined.

9. A measuring device as claimed in claim 1, characterised in that the sensor is constituted by an exciter coil and two secondary measurement coils constituting two branches of a Wheatstone bridge.

10. A measuring device as claimed in claim 1, characterised in that the sensor pole pieces-to-wall surface distance obtaining means is defined by means for generating one different higher frequency than that used for the measuring means.

11. A measuring device as claimed in claim 1, characterised in that the sensor is constituted by said electric coil and at least one measurement coil.

12. The thickness measuring device as defined in claim 1 wherein said core is of generally n-shaped configuration said electric coil is mounted on a central vertical branch and the two bridge coils are mounted on adjacent horizontal branches of the L core.

13. A measuring device as claimed in claim 1, characterized in that the measured value constituting the thickness signal is obtained from one of the modulous and from the real part and from the imaginary part of the voltage across the coil, while the latter is fed by said sinusoidal current supplying means in the form of a current-control generator.

* * * * *